United States Patent [19]

Parthasarathy et al.

[11] 3,917,739

[45] Nov. 4, 1975

[54] PARAFFIN HYDROISOMERIZATION PROCESS

[75] Inventors: R. Parthasarathy, Silver Spring; James Michael Maselli, Columbia, both of Md.

[73] Assignee: W. R. Grace & Co., New York, N.Y.

[22] Filed: Aug. 9, 1973

[21] Appl. No.: 387,074

[52] U.S. Cl. ........................ 260/683.65; 252/455 Z
[51] Int. Cl.² .......................................... C07C 5/30
[58] Field of Search ............................... 260/683.65

[56] References Cited
UNITED STATES PATENTS

| | | | |
|---|---|---|---|
| 3,299,153 | 1/1967 | Adams et al. ................... | 260/683.65 |
| 3,370,099 | 2/1968 | Plank et al. ..................... | 260/683.65 |
| 3,527,835 | 9/1970 | Benesi ............................ | 260/683.65 |
| 3,770,845 | 11/1973 | Hirschler ....................... | 260/683.65 |

*Primary Examiner*—Paul M. Coughlan, Jr.
*Attorney, Agent, or Firm*—Joseph P. Nigon

[57] ABSTRACT

An improved hydro-isomerization catalyst composed of platinum and/or palladium distended as very small crystallites on a hydrogen form mordenite base is disclosed. The catalyst is prepared by distending the noble metal on the base by addition of small quantities of cerium nitrate in admixture with the noble metal followed by controlled calcination to achieve an almost monatomic dispersion of the noble metal on the base. The catalyst thus prepared is used to isomerize normal paraffins in the $C_4$ to $C_7$ range in the presence of hydrogen at elevated temperature and pressure.

1 Claim, No Drawings

PARAFFIN HYDROISOMERIZATION PROCESS

BACKGROUND OF THE INVENTION

1. Field of the Invention

The invention relates catalytic isomerization of low molecular weight normal paraffins. More particularly, it relates to the method of preparing paraffin hydro-isomerization catalysts comprising platinum or a palladium metal highly dispersed and homogeneously distributed into and onto a synthetic crystalline aluminosilicate mordenite support.

2. Description of the Prior Art

Isomerization of low molecular weight normal parraffins having 4–7 carbon atoms per molecule is a well established process in the petroleum refining industry. This catalytic isomerization requires an acidic catalyst. Earlier processes relied on strongly acidic Friedel-Crafts catalyst such as acid promoted aluminum chloride. Comercial refining processes favor the use of heterogeneous catalysts; however, and various isomerization processes have been developed that use acid-acting refractory oxide catalysts. Recently noble metal catalysts based on a hydrogen form of a crystalline alumino silicate. Mordenite has been shown to be equally effective. Further improvement have been achieved by preferentially acid leveling the mordenite to increase the silica-alumina ratio before incorporation of the hydrogenation component.

The mordenite form of the zeolites — particularly the synthetic mordenite form — has been disclosed in U.S. Pat. No. 3,190,939, to Benesi, issued June 1965 and U.S. Pat. No. 3,299,153, to Adams, issued January 1967. One of the problems that must be solved in isomerization catalysts is the prevention of excessive hydrocracking. The addition of noble metals to the mordenite catalyst base tends to reduce cracking. However, the catalyst previously proposed, even those containing noble metals, still require improvement in the reduction of cracking. It is particularly important to improve the selectivity to branched isomers and to increase process stability.

The incentive for an efficient process for isomerization of normal paraffins is apparent from a comparison of the octane numbers of normal pentane and normal hexane with their respective isomers.

| Compound | Research Octane Number |
|---|---|
| n-Pentane | 61.7 |
| Isopentane | 92.3 |
| n-Hexane | 34 |
| 2-Methylpentane | 73.4 |
| 3-Methylpentane | 74.5 |
| 2,2-Dimethylbutane | 91.8 |
| 2,3-Dimethylbutane | 103.5 |

The economics of petroleum refining are such that marginal improvements in product value over feed cost would justify only efficient selective and relatively inexpensive processes. The isomerization process must be selective in producing the desired isomers and in minimizing cracking to gaseous products to be of commercial significance. Since noble metal catalysts costs are high, the catalysts must have long life and be easily regenerated.

BRIEF DESCRIPTION OF THE INVENTION

We have developed a hydro-isomerization catalyst that is highly selective for preparation of isomers of the $C_4$ to $C_7$ normal paraffins and that effectively suppresses the percentage of the feedstock that undergoes hydrocracking. The catalyst is prepared by distending platinum and/or palladium on a hydrogen form mordenite support as very small crystallites. The distension onto and into the hydrogen form mordenite base is effected by incorporating the noble metals on the support in conjunction with small quantities (less than 5% by weight) of a soluble cerium salt followed by controlled calcination. This process achieves an almost monatomic dispersion of the noble metal on the hydrogen form mordenite base and results in a highly active and selective catalyst.

DETAILED DESCRIPTION OF THE INVENTION

The first step in the process of our invention is the preparation of the catalyst base. The catalyst base is a commercially available mordenite. While mordenite is a naturally occurring mineral, a synthetic mordenite is available commercially from the Norton Company and marketed under the trade name "Zeolon". Mordenite is characterized by its high silicon to aluminum ratio of about 5:1 and its crystal structure. It has a pore size of about 7 angstroms.

Conversion of the sodium form to the hydrogen form is achieved either by a direct replacement of sodium ions with hydrogen ions or by replacement of sodium ions with ammonium ions followed by decomposition of the ammonium form by calcination. At least 95, preferably about 99% of the alkali metal is removed by ion exchange.

The mordenite base can also be further improved by subjecting it to a sequential treatment with hot acid at a temperature of about 93° to 149°C followed by treatment with cold acid at a temperature of 10–38°C and by treatment with an ammonium compound.

For the acid treatment both organic and inorganic acids can be used. The strong acids are preferred. Examples of acids particularly suitable are the strong mineral acids such as phosphoric, sulfuric, nitric, and hydrochloric acids. Hydrochloric acid is especially suitable and is the preferred acid in both the hot and cold treating steps.

Usually aqueous solutions of the acid are preferred. The concentration may vary over a broad range of about 0.1 to 10 N. It is convenient and especially preferred to use an acid in aqueous solution of 2 N concentration. The hot acid treating step is preferably carried out at about the boiling temperature of the acid solution. The cold acid treatment is conducted at a temperature in the range of 10° to 38°C and preferably an ambient temperature.

The ammonium compound treating step is carried out with any ammonium compound which can form ammonium ions. However, aqueous solutions of neutral ammonium compounds are preferred, especially inorganic ammonium compounds such as ammonium hydroxide, ammonium chloride, ammonium sulfates, ammonium phosphates and ammonium nitrate. Ammonium nitrate is preferred. The concentration of the ammonium compound is not critical and can vary, for instance, from 0.1 to 5 M. However, it is preferred to use a solution of about 1 M concentration. The treatment of the ammonium compound can vary over a wide range. It is preferred, that the treatment be carried out at a temperature in the range of 93° to 149°C at about the boiling temperature.

The essential feature of the process in the instant application is the method of distending the noble metals on the base. At isomerization temperatures noble metal catalysts lose activity with use. This, of course, requires frequent catalyst replacements which are inconvenient, time consuming and costly. One of the reasons for the loss of activity of these noble metals is the surface migration of the noble metal at elevated temperatures which results in coalescing the small particles of the noble metal crystallites into large crystallites. This crystallite growth in turn results in appreciable loss of specific surface area and hence catalytic activity. In our novel process we disperse the noble metal crystallites in the catalyst as crystallites in the 5 to 30 Angstrom size range. This is indeed a very high degree of dispersion considering that the atomic diameters in noble metals fall in the range of 2.7 to 2.9 angstrom units.

The key to this unusual degree of dispersion of the catalyst in the instant invention is the use of low quantities, generally less than 5% by weight, of soluble cerium salts in admixture with soluble salts of the noble metals in the impregnation step. The impregnation is followed by controlled calcination to achieve this very fine dispersion of noble metal on the catalyst.

The noble metal, preferably palladium or platinum, can be incorporated from a solution of any soluble salt of the metal. Examples of suitable salts include the nitrate, the chloride, the tetraamine nitrate, etc. The nitrate is preferred. The impregnation or exchange is normally carried out with a mixture of the noble metal salt and the cerium salt to give a noble metal content of about 0.02 weight percent basis finished catalyst and not exceeding abbut 5% by weight. It is preferred the metal content be at least about 0.1% by weight and not over about 1.5% by weight. The cerium is present as about 0.1 to 5% by weight cerium oxide and preferably 0.5 to 2% by weight.

This homogeneous distribution of the dispersed platinum or palladium metal, as contrasted to non-homogeneous dispersion, has a marked effect on isomerization selectivity, both in production of desired disubstituted isomers and in reduction of cracking.

The noble metal deposited on the catalyst surface must be reduced to the metallic state to achieve catalytic activity. This is conveniently accomplished by contact with hydrogen at elevated temperatures. It has been found that when the reduction temperature exceeds about 930°F the dispersion of metal is impaired. The metal tends to agglomerate even in the presence of the cerium and loss of active metal surface and catalytic activity results. This loss is minimized by control of the reduction temperature at 500° to 900°F and preferably about 700°F.

The feed to the isomerization process using the catalyst of the present invention can be substantially pure normal paraffins having 4 to 7 carbon atoms, mixture of such normal paraffins or hydrocarbon fractions rich in such normal paraffins. Suitable hydrocarbon fractions are the $C_4$ to $C_7$ straight-run fractions.

Isomerization is conducted at temperatures in the range of 400° to 650°F and preferably about 500° to 600°F. At lower temperatures, conversion of normal paraffins is generally too low to be practical, although selectivity to isoparaffins is substantially 100%. At higher temperatures, conversion of normal paraffins is quite high; however, excessive cracking is encountered and selectivity to isoparaffins is low as a result. The isomerization can be conducted over a wide range of space velocities, but in general the space velocity should be in the range of about 0.5 to 10 and preferably 1 to 5. Space velocity, as the term used herein, refers to weight hourly space velocity and is expressed as weight of feed per hour per unit weight of catalyst. The isomerization is carried out in the presence of hydrogen at a pressure of 100 to 600 p.s.i.g., preferably 300 to 500 p.s.i.g. and a hydrogen to hydrocarbon mole ratio of 3 to 1 to 10 to 1.

Our invention is illustrated by the following specific but nonlimiting examples.

EXAMPLE 1

This examples illustrates one suitable method of preparing our hydroisomerization catalyst.

Commercially available mordenite in the hydrogen form was extruded as 1/16 inch extrudates. A 100 g. portion of these extrudates was impregnated with a mixed solution of palladium nitrate $(PdNO_3)_2$ and cerium nitrate $Ce(NO_3)_2 \cdot 6H_2O$. A sufficient quantity of the mixed salts was used to prepare a catalyst containing 0.5% weight palladium and 1% weight $CeO_2$. The catalyst was calcined for 6 hours at 1000°F prior to charging to the reactor.

EXAMPLE 2

This example demonstrates the improvement achieved by the dispersion of the palladium as a very fine dispersion on the mordenite base. An isomerization reactor was charged with a appropriate amount of the catalyst, prepared according to the process of Example 1, and was reduced by heating in hydrogen for a period of 2 hours at a temperature of 700°F. At the end of this time the isomerization reaction was carried out by feeding n-pentane through the reactor at a liquid hourly space velocity (LHSV) of 0.625. The isomerization was carried out at a hydrogen pressure of 450 p.s.i.g. and hydrogen to oil molar ratio of 6. Comparative runs were made in which the selectivity for formation of isopentane and the percent hydrocracking were compared with a catalyst containing 0.6% platinum on hydrogen mordenite, our catalyst containing both 0.5% Pd and 1% ceria and 0.5 Pd and 0.5% ceria also on hydrogen type mordenite base. The data collected is set out in Table I.

TABLE I

| Catalyst | 0.6% Pt on $H^+$- Mordenite | 0.5% Pd + 1% $CeO_2$ on $H^+$- Mordenite | 0.5% Pd + 0.5% $CeO_2$ on $H^+$ Mordenite |
|---|---|---|---|
| Temp., °F | 550 | 550 | 550 |
| Wt.% Conv. | 71 | 70.8 | 69.9 |
| % i-$C_5$ Selectivity | 82.5 | 95.4 | 93.0 |
| % Hydrocracking | 10.2 | 2.1 | 4.8 |

It is apparent from a review of these data that there is a substantial improvement in the isopentane selectivity and a substantial decrease in hydrocracking when using our catalyst containing as little as 0.5% ceria. Increasing the ceria to 1% results in a slight improvement in isopentane selectivity and a decrease in the percent hydrocracking.

EXAMPLE 3

This example compares the results obtained with a 0.6% platinum on acid-leached mordenite with a catalyst containing 0.5% palladium and 1% ceria on acid-leached mordenite. The isomerization was carried out using the same technique as described in Example 1. The acid-leached mordenite was prepared using the general technique described previously. The data collected in these runs is set out in the table below.

Table II

| Catalyst | 0.6% Pt on acid-leached Mordenite | 0.5% Pd + 1% CeO$_2$ on acid-leached Mordenite |
|---|---|---|
| Temp., °F | 550 | 550 |
| Wt. % Conv. | 71.2 | 70 |
| % i-C$_5$-Selectivity | 81.6 | 93.9 |

Table II-continued

| Catalyst | 0.6% Pt on acid-leached Mordenite | 0.5% Pd + 1% CeO$_2$ on acid-leached Mordenite |
|---|---|---|
| % Hydrocracking | 10.0 | 3.8 |

It is apparent from review of these data that substantial improvement is isopentane selectivity is achieved when the base is acid-leached mordenite. The percent hydrocracking is also decreased substantially.

What is claimed is:

1. A process for hydroisomerization of paraffins, having from 4 to 7 carbon atoms per molecule, at a temperature of 400° to 650°F., a pressure of 300 to 500 psig. and a hydrogen to hydrocarbon mole ratio of 3 to 1 to 10 to 1, by contacting said paraffins with a catalyst comprising from about 0.1 to 1.5 weight percent of a metal selected from the group consisting of platinum and palladium and from about 0.1 to 5 weight percent cerium oxide, said platinum or palladium homogenously dispersed as crystallites in the 5 to 30 Angstrom size range, the metal being dispersed into hydrogen form mordenite by contacting the base with a mixed solution of platinum or palladium nitrate and cerium nitrate followed by controlled calcination and reduction with hydrogen at a temperature of 500° to 900°F.

* * * * *